United States Patent Office 3,092,164
Patented June 4, 1963

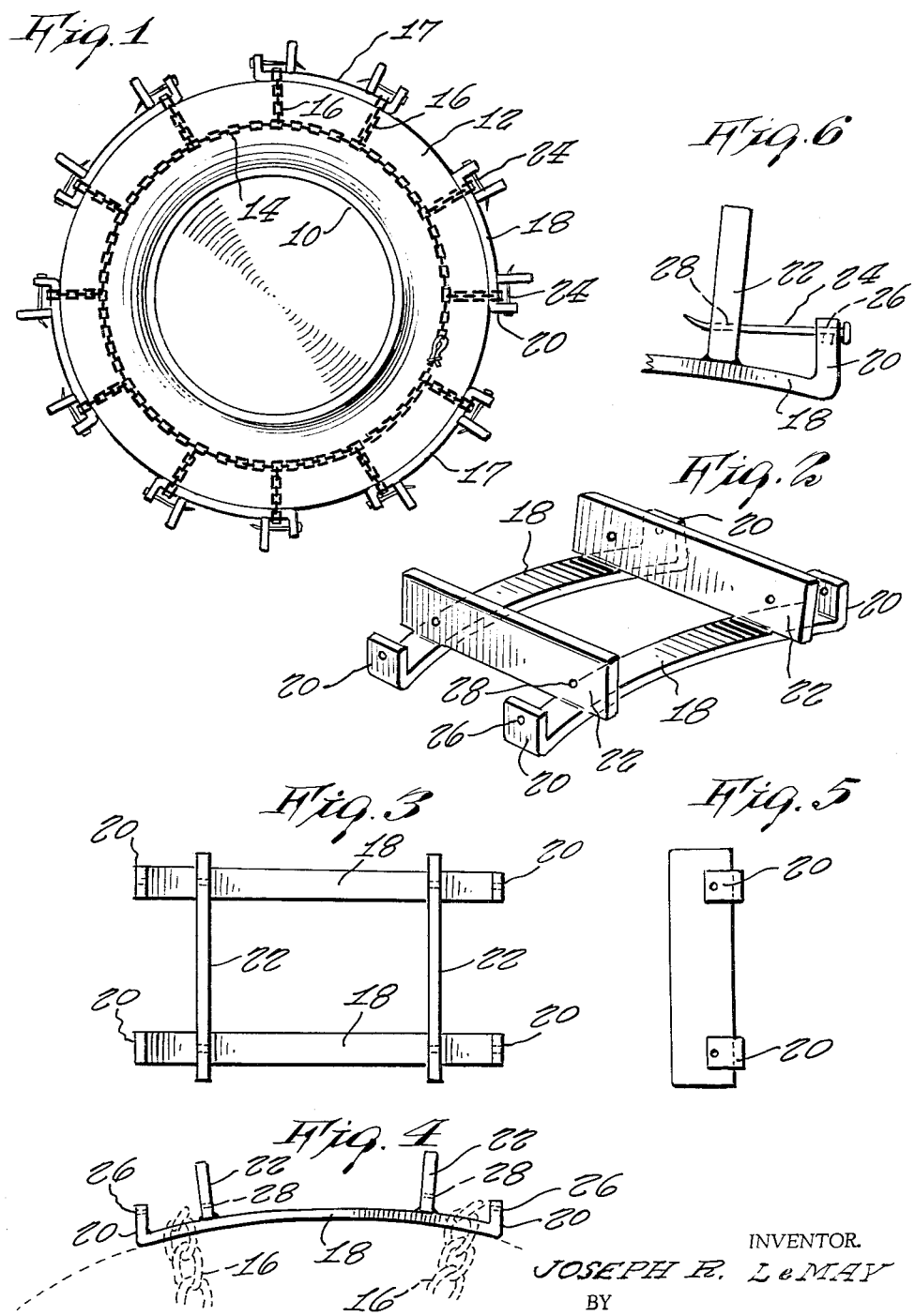

3,092,164
TRACTION DEVICE FOR WHEELED VEHICLES
Joseph R. Le May, 714 6th St., Wyandotte, Mich.
Filed Apr. 9, 1962, Ser. No. 186,204
2 Claims. (Cl. 152—239)

My invention is directed toward a traction device, which when attached to a wheeled vehicle such as an automobile, will provide sufficient additional traction to the vehicle to permit travel through mud, sand or similar soft and yielding surfaces.

It is an object of my invention to provide a new and improved traction device of the character indicated.

Another object is to provide a new and improved traction device of the character indicated which can be attached to and removed from wheels without the use of tools.

Still another object is to provide a new and improved traction device of the character indicated which cooperated with skid chains which, when attached to a wheel together with the device, hold the device in place.

All of the foregoing and still further objects and advantages of my invention will become apparent from a study of the following specification, taken with the accompanying drawing, wherein:

FIGURE 1 is a side elevation view of an automobile tire incorporating my invention;
FIGURE 2 is a perspective view of my invention;
FIGURE 3 is a plan view of my invention;
FIGURE 4 is a side view of my invention;
FIGURE 5 is an end edge view of my invention; and
FIGURE 6 is an enlarged detail view of my invention.

Referring now to the figures, a wheel 10 carries a tire 12. A skid chain has two circular chain sections 14 (only one of which is shown) which are in contact with opposite sides of the tire. Individual links of chains 16 interconnect the sections 14, extending around the periphery of the tire at equidistantly spaced positions.

A plurality of traction devices 17 are secured to the periphery of the tire in equidistantly spaced apart positions. Each device comprises two curved parallel brackets 18 having bent up end portions 20 at each end thereof. Two rectangularly shaped parallel lugs 22 span both brackets adjacent opposite end portions thereof and are welded thereto to form paddle-like members which provide the additional traction when the wheel is turning in mud, sand or similar soft and yielding surface. Brackets 18 are secured in position on the tire periphery by links of chains 16, each link extending between the corresponding end portions 20 of both brackets and an associated lug 22. Four pins 24 are associated with each of the devices 17, each pin extending through a hole 26 in a corresponding end portion and a corresponding hole 28 in the corresponding lug 22 to hold the appropriate link of chain 16 in position.

The pins can be readily inserted or removed to permit the links of chains to be installed or removed thus attaching or removing the traction devices as necessary.

While my invention has been described with particular reference to the drawings, my invention is not limited thereto, but rather is to be limited only by the terms of the claims which follow.

Having thus described my invention, I claim as new and desire to secure by Letters Patent:

1. A traction device comprising two parallel separated brackets having bent up end portions, and two parallel separated lugs extending transversely of said brackets, each lug being secured to both brackets adjacent corresponding ends thereof, said portions and said lugs having pin receiving holes.

2. In combination with a wheel, a tire on said wheel, a skid chain secured to said tire, and a plurality of traction devices secured to the periphery of said tire, said chain holding said devices in place, wherein each of said devices comprises a pair of parallel brackets curved to conform to the periphery of said tire and extending in a direction which is essentially perpendicular to the axis of said wheel, wherein each device includes a pair of parallel paddle-like lugs secured to both brackets adjacent opposite ends thereof, wherein each of said brackets has bent up end portions at opposite ends thereof, each device further including a plurality of pins, each pin extending between a corresponding end portion and a corresponding lug.

References Cited in the file of this patent

UNITED STATES PATENTS

| | | |
|---|---|---|
| 1,157,928 | Duff | Oct. 26, 1915 |
| 2,510,682 | Carr | June 6, 1950 |